United States Patent [19]

McGaughey et al.

[11] Patent Number: 4,496,185
[45] Date of Patent: Jan. 29, 1985

[54] DOOR FRAME CONSTRUCTION FOR PICKUP TRUCK CAP AND METHOD OF MANUFACTURE

[75] Inventors: Donald C. McGaughey; Bruce R. Bostian, both of Bristol, Ind.

[73] Assignee: State Wide Aluminum of Indiana, Inc., Elkhart, Ind.

[21] Appl. No.: 427,877

[22] Filed: Sep. 29, 1982

[51] Int. Cl.³ ................................................ B60J 1/00
[52] U.S. Cl. ...................................... 296/106; 296/146
[58] Field of Search .............. 296/146, 156, 100, 106; 52/656, 658; 403/403, 401, 382

[56] References Cited

U.S. PATENT DOCUMENTS

| | | | |
|---|---|---|---|
| 1,184,080 | 5/1916 | D'Arcy | 403/403 X |
| 2,102,110 | 12/1937 | Burkey | 296/106 |
| 2,765,525 | 10/1956 | O'Neill | 403/382 X |
| 3,287,041 | 11/1966 | Cohen | 52/658 |
| 3,857,601 | 12/1974 | Robbins | 296/100 X |
| 4,068,886 | 1/1978 | Gostomski | 296/100 |

Primary Examiner—David A. Scherbel
Assistant Examiner—Russell D. Stormer
Attorney, Agent, or Firm—Price, Heneveld, Huizenga & Cooper

[57] ABSTRACT

A trapezoidal door and frame assembly and method of manufacture in which the assembly is constructed of a top horizontal frame member having the ends thereof arcuately shaped to conform with the radius of the upper corners of the cap. The ends are formed without deforming the flanges extending from the outer face of the frame member by removing, in a novel and unique method, portions of the flanges which permits cutting the ends of the frame member along a radius which matches the upper corners of the cap. This top door frame construction permits mounting the frame member closer to the top of the cap, thus providing a larger access opening and door in the rear of the cap.

5 Claims, 19 Drawing Figures

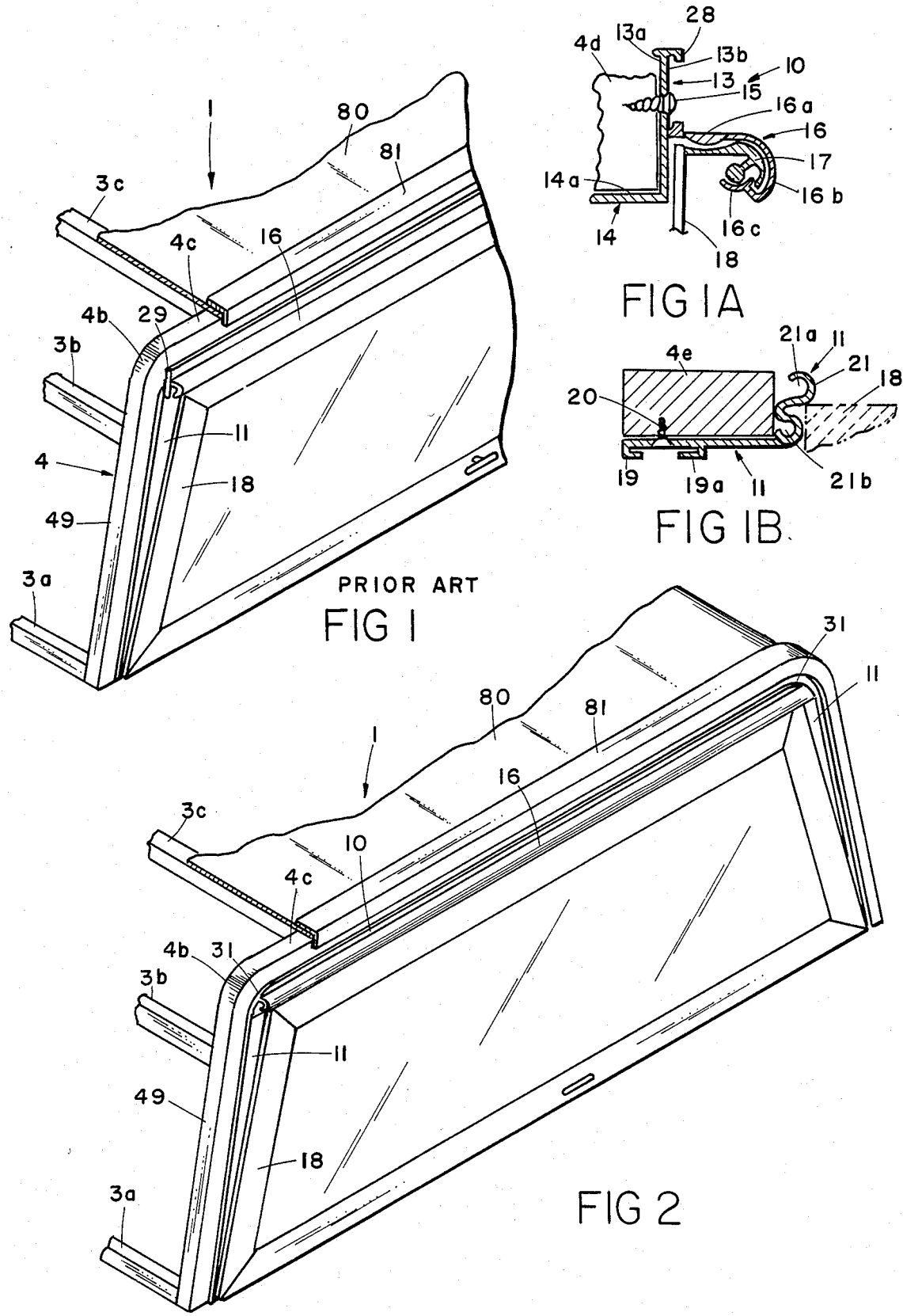

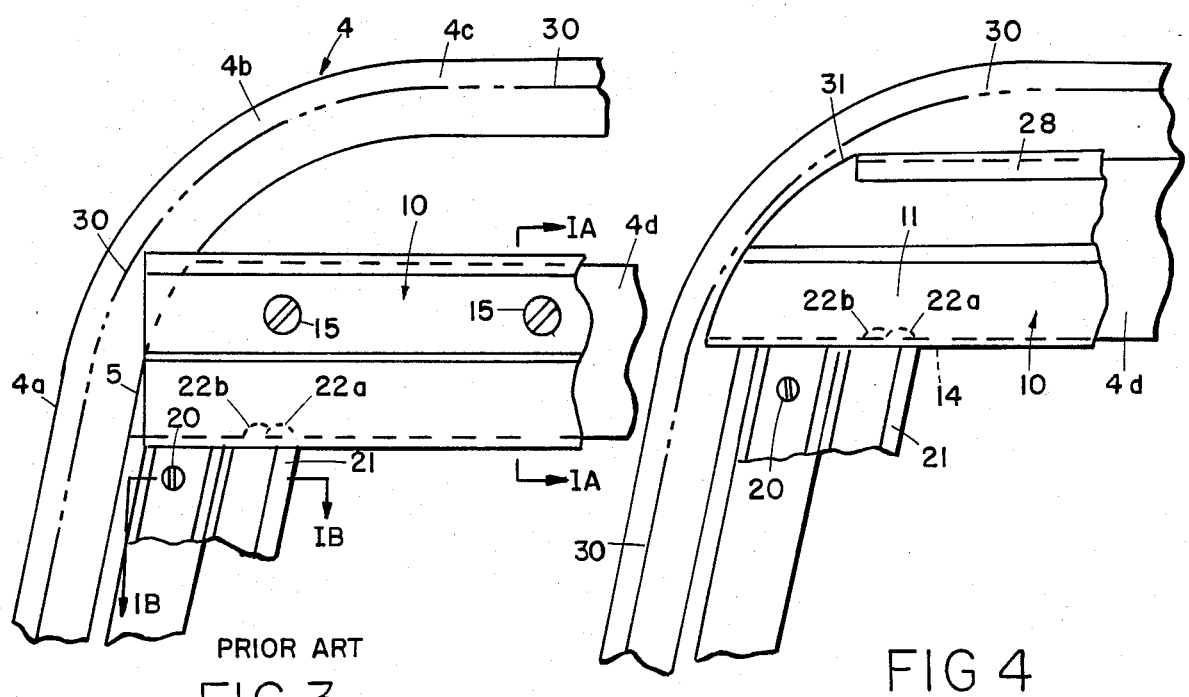
FIG 3 PRIOR ART
FIG 4
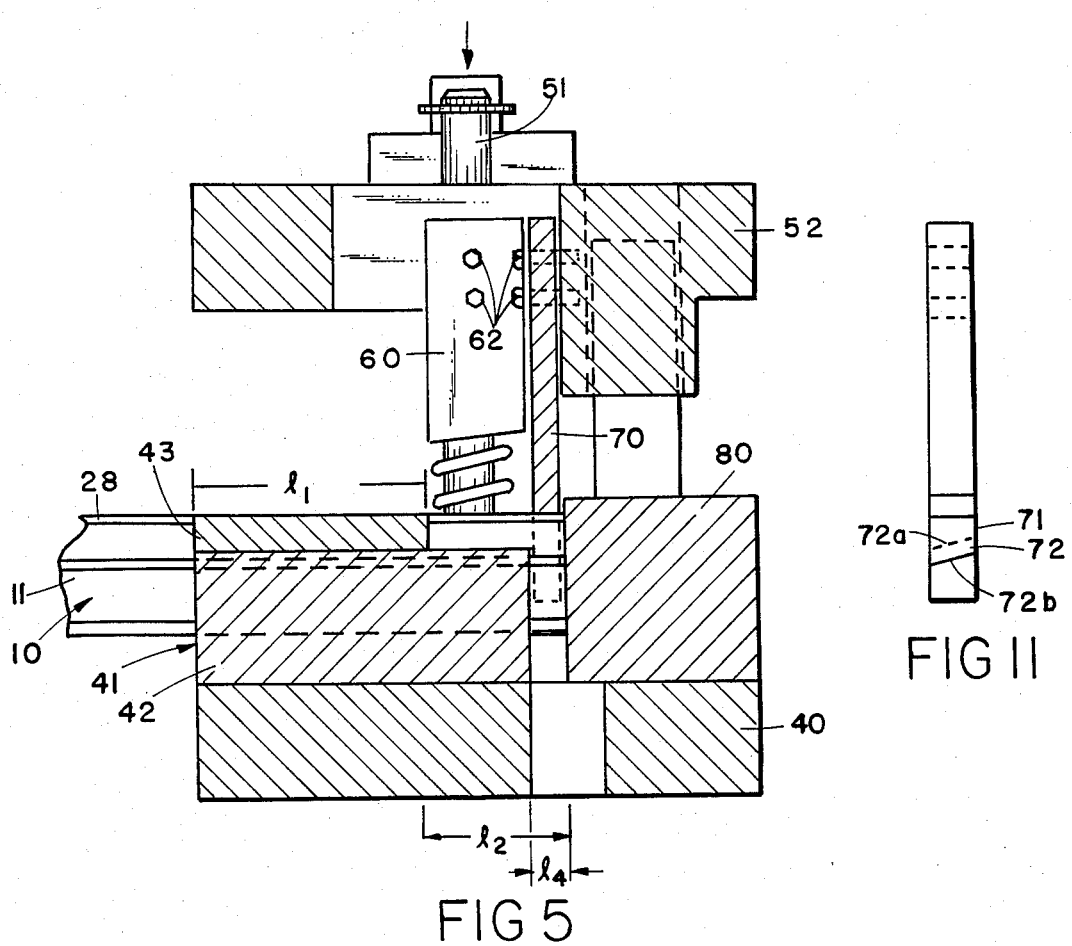
FIG 5
FIG 11

DOOR FRAME CONSTRUCTION FOR PICKUP TRUCK CAP AND METHOD OF MANUFACTURE

This invention relates to a door and frame assembly for pickup truck caps and to a method for forming the top horizonal frame member for the same.

BACKGROUND OF THE INVENTION

Enclosures or so-called "caps" for the bed of pickup trucks have become very popular. Caps of this type generally have included sides with arcuate corners to match the cab of the truck. At the rear of the cap a door is provided which covers the space between the tailgate and the cap top wall. This door swings upwardly and is mounted on a frame, such door and frame assembly being generally manufactured by specialty companies who sell the assembly to the truck cap manufacturer.

The caps of various manufacturers have cap sides inclined at different degrees to align the cap sides with the cab of the truck. Accordingly, suppliers offer assemblies with the sides of the door and frame at different angles to fit the caps. However, economics dictates that the number of such differently angles assemblies be limited and thus in general the different degree doors offered by the industry are 11, 15 and 17 degrees. This economic limitation has assisted in creating a problem that has plagued the industry for years primarily because of the construction and shapes of the top horizontal door frame member which essentially has become the standard for the industry.

The structure and shape of the top door frame member that causes the problem is that it is an extruded metal piece having a flat part with one surface adapted to abut against the rearward face of a cross support forming a part of the cap frame at the rear thereof. The opposite surface has an integral hinge flange of a complicated configuration extending rearwardly of the cap and adapted to telescopingly receive a similarly configurated hinge flange formed at the top edge of the door. The opposite surface also has a channel protrusion extending therefrom for receiving a trim strip that hides the fasteners which attach the door frame to the cross support of the cap frame.

Before our invention, the ends of the top door frame member have been cut along a straight vertical line which causes the extreme upper corner of the frame member to extend into and interfere with the molding formed on the top and sides of the door unless such corner is snipped off by the cap manufacturer or the cross support of the cap frame is moved downwardly thus reducing the size of the door.

Snipping off the corner is very unsatisfactory because it produces an unsightly appearance and also leaves a ragged sharp edge on which a person can be scratched or cut. Moving the cross support of the cap frame downwardly restricts the space between such cross support and the top edge of the tailgate leaving less space to enter the cap and also reducing the size of the door. Further, the appearance is adversely affected because the top of the door frame is located a greater distance from the top of the cap.

The industry has been attempting for years to solve the above problem but prior to our concept it has remained insolved.

The appearance of the standard trapezoidal door as above described, also has much to be desired because the ends are straight and do not in any way blend in with the arcuate shaped silhouette of the cap. As a result, so-called "radius" door and frame assemblies have been developed. Such radius assemblies form the sides and top of a bent metal frame member that more nearly conforms to the shape of the cap. However, the strength of trapezoidal doors is far superior and accordingly radius doors are not generally used where strength is a factor.

SUMMARY OF THE INVENTION

In accordance with our invention, we provide a trapezoidal door and frame assembly in which the ends of the top horizontal frame member are arcuately shaped with a radius substantially conforming to the radius of the cap molding and thus substantially conforming to radius of the upper corners of the cap. As a result, the assembly blends in with the cap.

In addition, our construction eliminates the upper protruding corners of the door frame member thus avoiding interference with the molding around the door. This permits the cross support on the cap which supports the door frame member to be moved upwardly to increase the size of the door and the size of the opening into the cap.

We accomplish the above advantages by providing a novel construction of the top horizontal door frame member. More specifically, at the ends of the frame member, the hinge flange and channel protrusion are stripped from an end portion of the upright flat part of the frame member, i.e., the part that is secured to the cross support of the cap frame. This permits the stripped portion of the flat part to be cut along an arc conforming substantially to the arc of the top corners of the cap.

The stripping of the hinge flange and channel protrusion is performed by a novel method using a novel die and cutting tool assembly which severs or shears a portion of each of the flange and protrusion along lines on the plane of the outer surface of the flat part to which they are attached; and cutting the same away from the part so as to completely remove the severed portion from the part. This leaves an end portion of the flat part which can be cut without crushing or deforming the hinge flange and channel protrusion.

BRIEF DESCRIPTION OF THE DRAWINGS

Having briefly described the prior art and its problems, and having briefly set forth the objects and a brief description of our invention, it will become more evident upon reading the following detailed description in conjunction with the appended drawings wherein:

FIG. 1 is a partial perspective view of a rear portion of a truck cap disclosing a prior art door and frame construction;

FIG. 1A is a cross-sectional view of the door hinge taken along the plane IA—IA of FIG. 3 with a door hinge flange in place;

FIG. 1B is a cross-sectional view of the side frame members of the door frame taken along the plane IB—IB of FIG. 3;

FIG. 2 is a partial perspective view of a rear portion of a truck cap in which the novel door and frame construction of this invention is depicted;

FIG. 3 is a sketch illustrating the relationship of the corner portion of a prior art door frame construction to a corner portion of the rearward part of a cap frame;

FIG. 4 is a sketch similar to FIG. 3 but illustrating the relationship of the corner portion of our invention's door frame construction to a corner portion of the rearward part of a cap frame;

FIG. 8 is a front elevational view of a tool and die assembly used in forming the end form as shown in FIGS. 5C, 6C and 7C;

FIG. 11 is a side-elevational view of one of the cutting tools of the tool and die assembly of FIGS. 8, 9 and 10.

Referring to FIG. 1, reference numeral 1 designates a pickup truck cap constructed of the cap frame 2 comprising the longitudinal stringers 3a, 3b and 3c connected to the end frame member 4 which, as disclosed by the cutaway portion, includes the upright portions 4a and top portion 4c between which is the arcuate corner portion 4b bent to form an arc which is compatible with the shape of the truck cab (not shown). The cap frame 2 also includes a cross support 4d (FIG. 3) secured at 5 to the portions 4a and 4b at the juncture thereof and a side support member 4c (FIG. 3) secured to support 4d at 7. Cross support 4d is provided to give rigidity to the rearward portion of the cap frame and to provide a support for the top horizontal door frame member 10, the cross section of which is more specifically disclosed in FIGS. 5A, 6A and 7A. Side support members on each side of the cap also give rigidity to frame 4 and are provided to support the side frame members 11 and 12 (FIGS. 1 and 3) of the door frame.

Figure 5A:
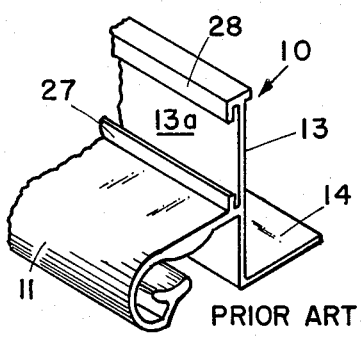
FIGS. 5A, 5B and 5C are perspective views of the end of the top horizontal door frame member in its various forms during the forming of the same, FIG. 5A being a conventional prior art end, FIG. 5B being an end on which the first step of the method has been performed, and FIG. 5C being the final form of the ends of the frame member.
Figure 6A:
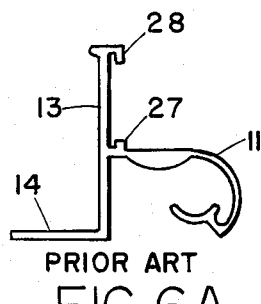
FIGS. 6A, 6B and 6C are elevational end views of the end forms depicted in FIGS. 5A, 5B and 5C, respectively.
Figure 7A:
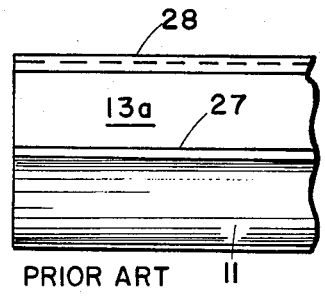
FIGS. 7A, 7B and 7C are elevational side views of the end forms depicted in FIGS. 5A, 5B and 5C, respectively.

Cap 1 also includes the cover 80 extending over frame 4 and also includes the molding 81 extending around the edges of cover 80 for hiding the seams.

The door and frame assembly comprising top horizontal frame member 10 and side frame members 11 and 12 are conventional. Frame member 10 is an extruded aluminum piece having a configuration as disclosed in FIG. 1A. Thus, it has an L-shaped section formed by the upright plate-like leg or part 13 and the flat horizontal leg or part 14.

The L-shaped frame member 10 is mounted on the cross support 4d of cap frame 2 with the inner face 13a of the leg or part 13 abutting against the outer face of cross support 4d and the inner surface 14a of the leg 14 abutting against the bottom surface of this cross support 4d. Frame member 10 is secured to the support 4d by fasteners 15 spaced along the length of the frame member 10. Formed integrally on the outer face 13b of the upright plate-like part 13 is the hinge flange 16 having a well-known complicated configuration which includes the web 16a, the curl 16b and a bearing curl 16c.

Flange 16 a hinge part is shaped to receive a complementary door hinge flange 17 extending along the entire length of the top edge of the door 18. The door thus is pivotally mounted by the telescoping flanges 16 and 17 and fits between the side frame members 11 having a configuration as shown in FIG. 1B. This configuration includes the flanges 19 forming channels for receiving a trim strip which hides the fasteners 20 and a door stop 21 provided by the flange 21 located on the inside edge of the side support member 4e. Flange 21 also provides a means for securing the side frame member 11 to the flange 14 by the metal screws 22a and 22b which are screwed into the openings 21a and 21b formed in the flange 21 as shown in FIG. 3 and FIG. 1B.

In this prior art structure, the flange or leg 13 is cut at a right angle as shown in FIGS. 1 and 3 which creates an interference problem with the molding surrounding the door and door frame. FIG. 3 illustrates this problem. Assuming that the molding around the door and door frame extends along the arcuate line 30, it is necessary that the door frame does not extend beyond this line. In order to prevent the corner of frame member 10 from extending over the line 30 it is necessary that the cross support 4d of the cap frame, and accordingly the frame member 10, must be located a substantial distance below the top horizontal portion 4c of the cap frame 4 as shown in FIG. 3. This greatly reduces the height of the door which can be fit into the frame, a problem that has existed for years without any solution.

Further, as shown in FIGS. 1 and 3, the straight line square shape of the end of the frame member 10 gives an undesirable aesthetic appearance to the entire assembly. The industry has endured this undesirable appearance for years without any solution. FIGS. 2 and 4 disclose a solution made possible by this invention, i.e., cutting the end of the frame member 10 along an arc which substantially matches the top corners of the cap, such cut being along the line 31. Having made this conception, the problem then presented is the forming of the arcuate ends at a practical cost without deforming the hinge flange 16 and the channel flange 28, it being evident that deformation of these flanges would prevent insertion of the door flange and the trim strip as previously discussed.

We have solved this problem by a unique and novel method involving the steps as illustrated in FIGS. 5A-C, 6A-C and 7A-C. Referring to these figures, it will be seen that FIG. 5A represents the prior art square cut end which includes the upright plate-like leg 13 and the flat horizontal leg 14. Extending from the top edge of leg 13 is the channel flange 28 which in cooperation with the flange 27 provides a channel for receiving and holding a trim strip (not shown). The flanges 28, 27 and hinge flange 16 are formed as an integral part of the legs 13 by the extrusion process.

The first step in our method is to cut the extrusion into lengths as required for support of the door, it being understood that the required spacing of the side frame members 11 which are attached to the extreme ends of the leg 14 of the frame member 10, determines such lengths. Thus, initially the length of the frame member 10 before being processed is the same as in the prior art construction of FIG. 1.

Figure 5B:
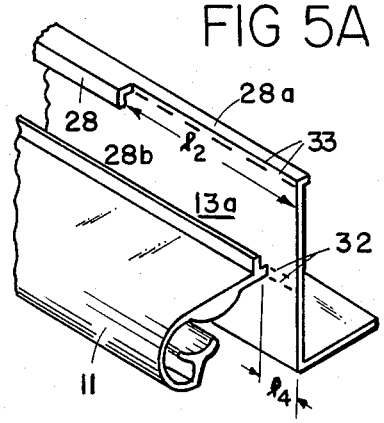
Figure 6B:
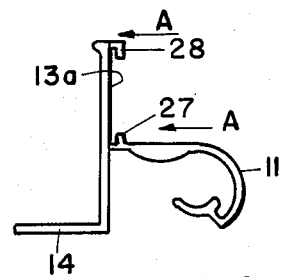
Figure 7B:
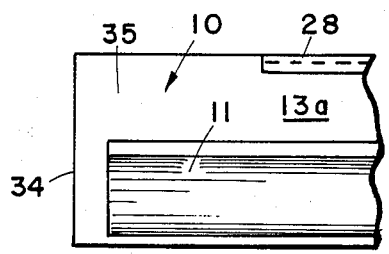

The second step is to shear the flanges 16 and 28 as illustrated in FIGS. 5B, 6B and 7B. Specifically, hinge flange 16 is sheared along the lines 32 on the plane of the space of surface 13a. It is also sheared in a direction designated by the arrow A (FIG. 6B) so as to completely remove an end portion of the hinge flange 16.

The flange 28 is also sheared along the plane of the face of surface 13a along the lines 33 and is removed from the leg 13 by cutting the flange in the same direction A. This produces the shape as shown in FIGS. 5B, 6B and 7B, that is, with the flange 16 terminating short of the extreme ends 34 of the frame member 10, it being evident from FIGS. 5B and 7B that the channel flange 28 terminates much shorter than the hinge flange 16.

As illustrated in FIG. 7B, this leaves the ends of the frame member 10 with a flat surface portion 35 free of any protrusions. The extent of this flat surface portion 35 can be varied depending upon the amount of the flanges 16 and 28 removed.

The next step in the operation or process is cutting through this flat portion 35 along the radius line 36 which is chosen to correspond and be compatible with the radius of the top corners of the cap. This cut 36 is preferably accomplished by a tool and die operation.

Figure 5C:
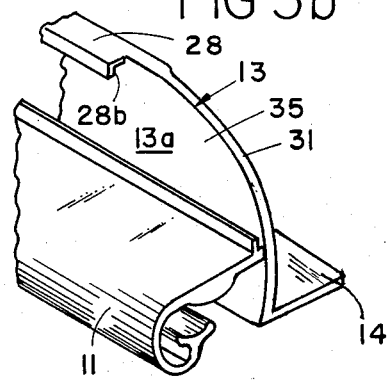
Figure 6C:
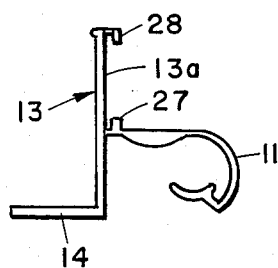
Figure 7C:
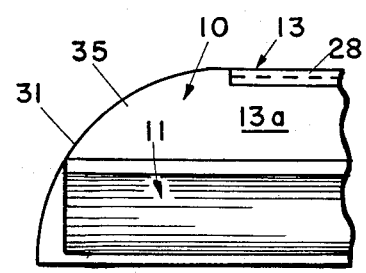

It will be seen by comparing FIGS. 3 and 4 that the shape of the end of frame member 10 as illustrated by FIGS. 5C, 6C and 7C accomplishes the solution to the problems referred to above. First as compared with FIG. 3, the configuration at the ends of the frame member 10 permits the entire frame 10 to be moved upwardly thus increasing the opening for the door. This in turn permits a larger door and larger space for access into the cap. At the same time as illustrated by FIG. 4, the radius 31 can be made to match or nearly match the radius of the top corner of the cap.

Figure 9:
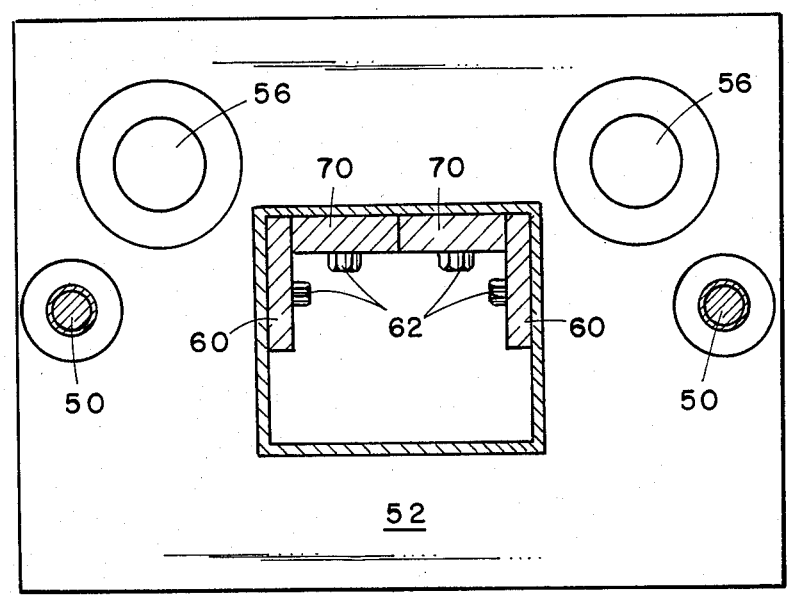
FIG. 9 is a cross-sectional view of a portion of the assembly of FIG. 8 taken along the plane IX—IX of FIG. 8.
Figure 10:
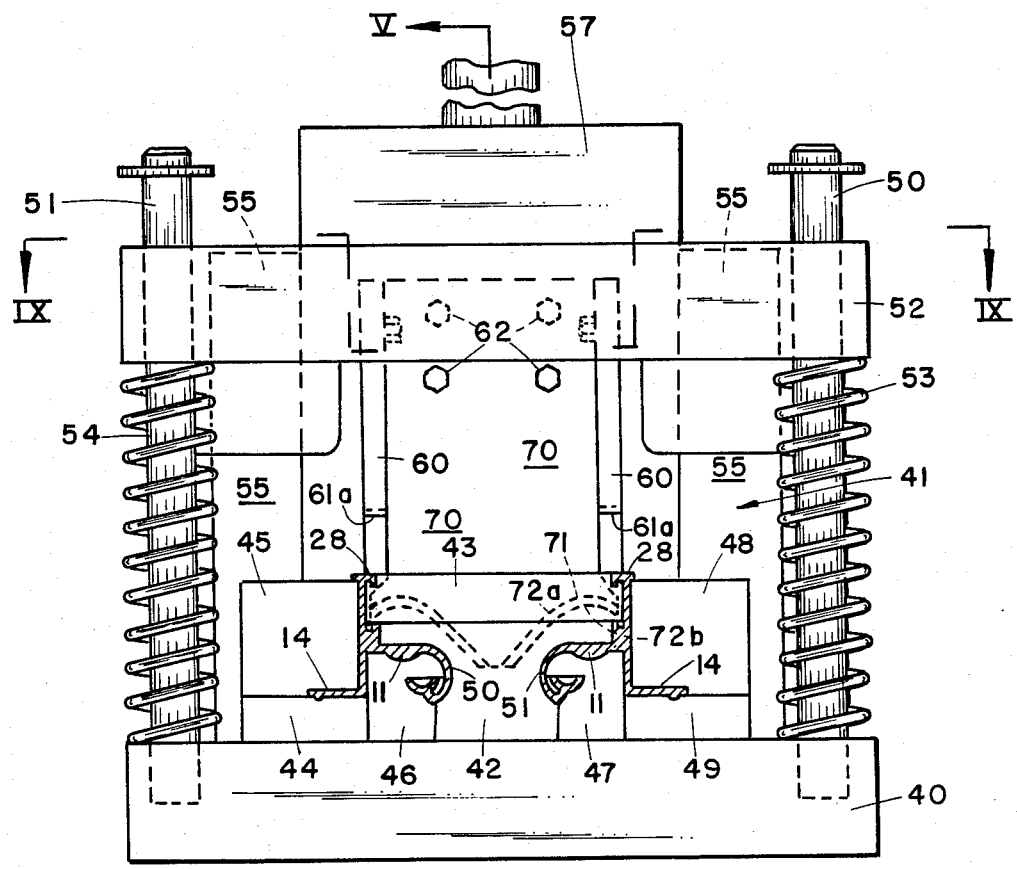
FIG. 10 is a side-elevational view taken along the plane X—X of FIG. 8.

FIGS. 8, 9 and 10 sketchedly disclose tool and die apparatus for performing the operations as decribed above. This apparatus includes the base 40 supporting the die block assembly 41 which is constructed to receive both a right hand and left hand end of the frame member 10. This is accomplished by providing a number of die blocks 42, 43, 44, 45, 46, 47, 48 and 49. The die blocks 42, 46 and 47 are formed so that when assembled, the cavities 50 and 51 have the approximate shape of the hinge flange 16. Mounted on top of the die block 42 is the die block 43 shaped at its corners to receive channel flanges 28. The two die blocks 44 and 45 are shaped to provide a cavity for receiving the leg 14. The die blocks 48 and 49 are similarly shaped. Base 40 also supports the stop block 80 which provides a stop for properly positioning frame member 10 in the assembly before the cutting tools are actuated.

The length of the die blocks are disclosed in FIG. 10. Die block 43 has a length l1 which establishes the distance l2 which is the length of the flange 28 removed from the surface 13a as shown in FIG. 5B. This distance l2 is the spacing between the end of the die block 43 and the stop block 80 against which the end of the frame member 10 abuts during the cutting operation.

The length of the die blocks 42, 46 and 47 is l3 which establishes the length l4 of the hinge flange 16 that is removed from the surface 13a.

Mounted over the base 40 on the posts 50 and 51 is the header plate 52 supported on the springs 53 and 54 and also guided by the posts 55 and 56. Supported on the header 52 is the tool support 57 on which the cutter tools 60 and 70 are mounted.

Cutter tools 60 and 70 are mounted on the cutter support 57 by the bolts 62 as disclosed. The positions of these tools will correspond with the portions of the flanges 28 and 16 to be removed. Referring specifically to the cutter tool 61, it is essentially a flat tool having a cutting edge 61a inclined at an angle from the front to the rear of the tool assembly providing a forward cutting edge 61b that mades the cut 28b (FIG. 5B). The cutting edge 61a also makes a cut along the lines 28a. During this entire cutting step, the remainder of the flange 28 is backed by the die block 43. It should be understood that this cutting action is performed simultaneously on two ends of separate frame members 10, one being on the left hand and the other on the right hand.

The cutting tools 70 one of which is a right hand and the other a left hand, has a configuration as disclosed in FIGS. 8 and 11. The upper end is rectangular in shape. The lower end has the nose 71, shown in broken lines in FIG. 8, extending behind the die block 43 and portions of block 42 into the space between the two flanges 28 and 27. The nose 71 has an inclined arcuately shaped cutting edge 72 defined by the edges 72a and 72b. Cutting tool 70 operates by first cutting through the flange 16 along the plane defined by the two lines 32 (FIG. 5B) and then cutting transversely through flange 16 to remove the same and produce the configuration as shown in FIG. 5B. It should be understood that the severing and cutting action of tools 60 and 70 as described above in relation to the flanges 16 and 28 is accomplished in one stroke as the cutter tool support 57 is forced downwardly.

As previously described, after the designated portions of the two flanges 16 and 28 are severed from the surface 13, an unobstructed flat surface 13a remains for cutting flange 13 along a line represented by the arcuate edge 31. This is accomplished at both ends of the frame member 10 by a conventional tool and die operation to produce a member as disclosed in FIGS. 2 and 4. The two side frame members 11 are then secured to the flange 14 of frame member 10 at each end to provide the door frame. The door is then mounted on the frame by telescopingly sliding flange 17 of door 18 in the flange 16 to produce the door and frame assembly as disclosed in FIGS. 2 and 4. This door and frame assembly is shipped to the cap manufacturer who mounts the same on the cap frame 4 as described above in relation to FIGS. 3, 4, 1A and 1B.

Although I have described the preferred embodiment of my invention, it should be understood that other modifications and embodiments are possible within the broader spirit of the invention. Accordingly, it is intended that my invention be limited only as set forth in the appended claims.

The embodiments of the invention in which an exclusive property or privilege is claimed are defined as follows:

1. A trapezoidal frame and door assembly for a vehicle cap, said assembly including a door and a frame formed of two opposed side frame members inclined upwardly toward each other and terminating at an extruded top frame member, said top frame member having a plate-like part having a first surface adapted to abut against and be secured to the horizontal frame member of said cap, said plate-like part having a second surface on the opposite side thereof and located on a plane, a first and second projection extending from said second surface; said first projection including a flange at the upper end of said plate-like part and shaped to provide a channel for receiving a trim strip to cover up fasteners extending through said plate-like part; said door having a hinge part extending along the top edge thereof; said second projection including a channel for slideably receiving said hinge part of said door whereby when assembled said door hinge part is slid lengthwise in said channel and is supported thereby; the improvement comprising: said first and second projections of said extruded top frame member at the extreme ends thereof each having a severed edge located on different planes perpendicular to the plane of said second surface; said plate-like part adjacent said severed edges of said channel and flange being cut to produce arcuate-shaped ends; and said severed edges of said projections terminating short of the arcuate-shaped ends.

2. The frame and door assembly of claim 1 in which the said plate-like part is the upright leg of an L-shaped element in which the horizontal leg thereof extends in an opposite direction from said channel and flange.

3. A trapezoidal frame and door assembly for a vehicle cap, said assembly including a door and a frame formed of two opposed side frame members inclined upwardly toward each other and terminating at an extruded top frame member, said top frame member having a plate-like part having a first surface adapted to abut against and be secured to the horizontal frame member of said cap, said plate-like part having a second surface on the opposite side thereof and located on a plane, a projection extending from said second surface; said projection including a channel for slideably receiving said hinge part of said door whereby when assembled said door hinge part is slid lengthwise in said channel and is supported thereby; the improvement comprising: said projection of said top frame member at the extreme ends thereof having a severed edge perpendicular to the plane of said second surface, said plate like part adjacent said severed edge of said channel being cut to produce arcuate-shaped ends; and said severed edges of said projection terminating short of the arcuate-shaped ends.

4. A trapezoidal frame and door assembly for a vehicle cap, said assembly including a door and a frame formed of two opposed side frame members inclined upwardly toward each other and terminating at an extruded top frame member, said top frame member having a plate-like part having a first surface adapted to abut against and be secured to the horizontal frame member of said cap, said plate-like part having a second surface on the opposite side thereof and located on a plane, projections extending from said second surface; said projections including flanges at the upper end of said plate-like part and shaped to provide a channel for receiving a trim strip to cover up fasteners extending through said plate-like part; the improvement comprising: said extruded projection of said top frame member at the extreme ends thereof having a severed edge perpendicular to the plane of said second surface, said plate-like part adjacent said severed edge of said channel being cut on an arc to produce arcuate-shaped ends, and said severed edges of said channel projections terminate at a location short of said arcuate-shaped ends.

5. In a cap construction for a pickup truck and the like, said cap construction including a frame at the rear of said cap for supporting a frame and door assembly, said frame having inclined side frame portions forming an arc at each top corner, said frame including a horizontal cap frame member extending between the side frame portions near the top thereof for supporting the top frame member of a door frame; a trapezoidal-shaped door; a frame for said door; said door frame having a top horizontal frame member on which said door is pivotally mounted by telescoping flange members on each of said door and said horizontal door frame member and extending along the length thereof; said top horizontal door frame member including a plate-like part having a first surface thereof abutting against said horizontal cap frame member; said plate-like part having a second surface on the opposite side thereof and located on a plane, fasteners extending through said plate-like part and securing said top horizontal door frame member to said horizontal cap frame member; a channel-shaped protrusion along the top edge and extending from the second surface of said plate-like part for receiving a trim strip to hide said fasteners; said hinge flange also extending from said second surface; the improvement comprising: said flange and said channel-shaped protrusion at each end of said door frame each having a severed edge located on different planes perpendicular to the plane of said second surface; said flat end part being cut in the area adjacent the severed edged of said flange and channel protrusions to produce arcuate-shaped ends, whereby the top horizontal door frame member can be mounted nearer to the arcuate corner to provide space therebeneath to accommodate a larger size door; and such severed edges of said protrusions termination short of the arcuate shaped ends.

* * * * *